UNITED STATES PATENT OFFICE.

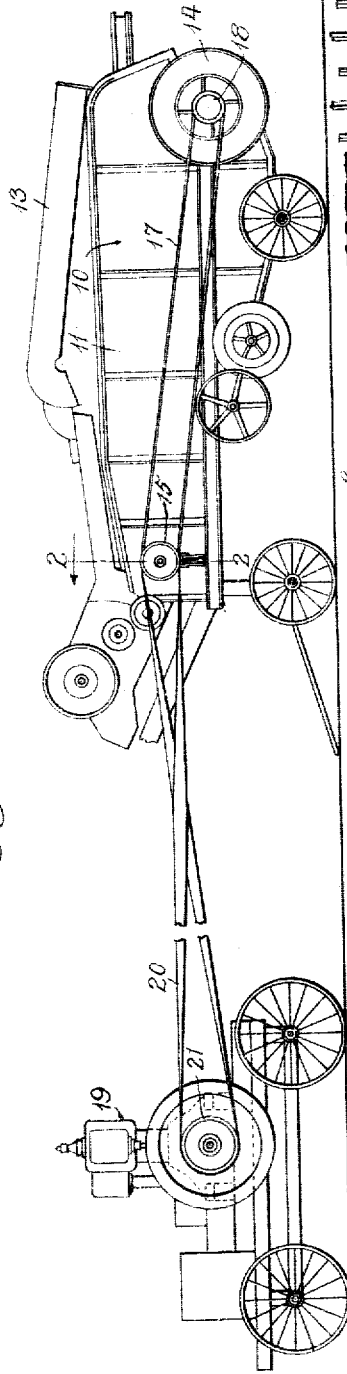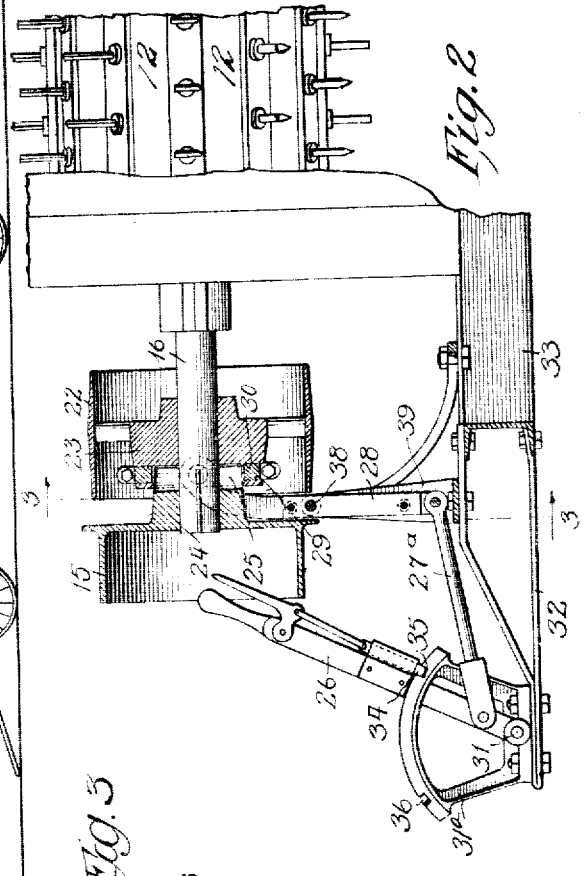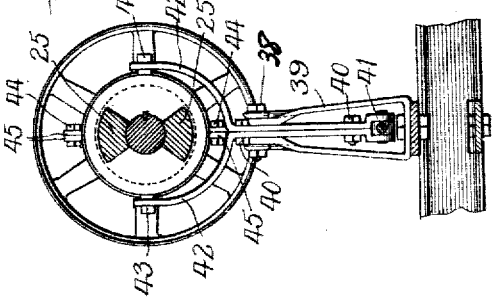

ANDREW O. LOEN, OF HOWARD, SOUTH DAKOTA.

THRESHING-MACHINE.

1,291,571.     Specification of Letters Patent.     Patented Jan. 14, 1919.

Application filed September 24, 1917. Serial No. 192,929.

*To all whom it may concern:*

Be it known that I, ANDREW O. LOEN, a citizen of the United States, residing at Howard, in the county of Miner and State of South Dakota, have invented new and useful Improvements in Threshing-Machines, of which the following is a full, clear, concise, and exact description, reference being had to the accompanying drawing, forming a part of this specification.

One of the objects of my invention is to provide a threshing machine of the type driven by a long belt from a suitable source of power such as a gasolene engine, with means whereby the toothed cylinder of the threshing machine may be readily and quickly disconnected from the drive belt, while the belt is still traveling, in case the main cylinder of the machine becomes jammed, or for any reason it is desirable that the separator attendant should quickly disconnect the main cylinder of the separator from the driving power. Further objects will appear from the detailed description to follow and from the appended claims. In the drawings, in which an embodiment of my invention is shown, Figure 1 is a side elevation showing a threshing machine or separator, driven by a long belt from a gasolene engine. Fig. 2 is a detail sectional view substantially on the line 2—2 of Fig. 1, showing the clutch. Fig. 3 is a section substantially on the line 3—3 of Fig. 2.

Referring now to the drawings in detail, the threshing machine or separator 10 may be in the main of any suitable or usual type, comprising a casing 11 in which the separating mechanism is inclosed, a toothed cylinder 12 to which the grain is fed, and a pneumatic stacker 13 through which the straw is discharged after the grain has been separated therefrom, a fan 14 for furnishing the wind for the pneumatic stacker 13, and a belt pulley 15 for driving the shaft 16, to which the toothed cylinder is secured.

The fan 14 is driven from the belt pulley 15, secured on the shaft 16, on which the toothed cylinder 12 is secured, by means of a belt 17, traveling over the pulley 15, and over a belt pulley 18, secured to the shaft of the fan 14.

The toothed cylinder 12 is driven from the gasolene engine 19 by means of a long belt 20 which extends over the belt pulley 21 on the gasolene engine 19, and over a belt pulley 22, which is slidably mounted on the cylinder shaft 16, whereby the hub 23 of the pulley 22 may be moved into and out of driving relation with respect to the hub 24 of the belt pulley 15, which is fast to the cylinder shaft 16. The engagement between the hubs 24 and 23 is effected by means of a pair of arcuate projections 25 extending from the hub 24 and engaging corresponding depressions or recesses in the hub 23, the straight or squared shoulders or side edges of the projections 25 engaging the shoulders or corresponding side edges formed by the walls of said recesses, when the pulley 22 is shifted over toward the pulley 15. These straight or squared edges, parallel with the axis of the shaft, afford interengaging surfaces for the transmittal of the power from the belt or pulley to the shaft, but may be readily separated by the lever mechanism when it is desired to disconnect the power from the machine; and at other times there is no undue strain placed on said lever mechanism because said shoulders do not tend to separate longitudinally under the strain of working.

The shifting of the pulley 22 is effected by means of a hand lever 26, a link 27ª suitably connected with the handle 26, a lever 28 to which the link 27ª is pivotally connected, and a collar 29 mounted in an annular groove 30 in the hub 23, to which the lever 28 is connected. The lever 26 may be pivotally mounted at 31 on a quadrant 31ª which is attached to a bracket 32, secured to the frame 33 of the separator, and may be provided with a latch 34 for engagement with the notches 35 and 36 of the quadrant 31ª. The lever 28 may be pivoted at 38 on a bracket 39 which may be secured to the bracket 32. The lever 28 may be formed of two straps or bars of metal secured together by means of bolts and nuts 40. These straps form a fork 41 which straddles the end of the link 27ª, which is pivoted in said fork. The straps also diverge at their upper ends to form a pair of arms 42, having openings to receive the trunnions 43 of the collar 29. The collar 29 may be formed in two semi-circular halves secured together by means of bolts 44 extending through openings in 45 on the two halves of the collar.

The operation is as follows:

The separator 11 is placed in the desired location, the engine 19 is lined up with the separator to bring the pulleys 21 and 22 into alinement, the belt 20 is placed over the pulleys 21 and 22, and the hand lever 26 is moved to the position shown in Fig. 2, in which the hubs 23 and 24 are in engagement. The engine 19 is then started up to drive the various parts of the separator 11, the toothed cylinder 12 being then driven from the belt 20, which drives the pulley 22, which in turn drives the hub 24 of the pulley 15, which is secured by a key on the cylinder shaft 18. The fan 14 is driven from the pulley 15 by means of the belt 17 which extends over the pulley 15 and also over the pulley 18. The other movable parts of the separating mechanism are driven in any suitable manner, not shown in detail.

It sometimes happens that the toothed cylinder 12 or other parts of the separator mechanism become jammed or choked, usually on account of the grain being wet or being fed to the machine too fast. This practically stops the cylinder, or slows it down. The drive belt 20 is usually a very heavy, strong belt, and the engine is frequently as high as sixty horse power, so that the separator mechanism is subjected to a very sudden heavy strain when it begins to choke, and sometimes is liable to break unless the machine is shut down at once. When a steam engine was used to furnish the power, it was necessary to have an attendant near the engine practically all the time in order to keep it supplied with fuel and water. When the gasolene engine came into use, however, attempts were made to dispense with a separate attendant for the engine, and to have one man attend to both the engine and the separator, as a gasolene engine did not require constant attention as did the steam engine. With this arrangement, with an attendant always near the engine, in case the separator began to choke, the engineer would probably notice the difference in its running, or would be notified by the separator attendant, and would at once shut off the power.

This left the attendant free to take charge of the separator most of the time. However, if the separator began to choke down, the attendant had to run over back to the engine before he could shut off the power. As the engine is usually located from 75 to 100 feet from the separator, it often happened that damage was done to the separator before the attendant could run back and shut off the power.

Furthermore, with a gasolene engine, even when a separate attendant was provided for the engine, the noise of the explosion would frequently prevent him from noticing that the separator was choked down and would prevent him from hearing the directions of the separator attendant, so that it would frequently happen that damage would be done to the separator before the power could be shut off.

Furthermore, even if the power was shut off as promptly as possible, the momentum of the heavy belt and the moving parts of the engine would still cause a heavy strain on the separator mechanism when the latter became choked.

In the case of the present invention, when the attendant sees that the separator is becoming jammed, he grasps the lever 26, releasing the catch 34, and pulls the lever over until the catch 34 engages the notch 36. This slides the pulley 22 longitudinally on the shaft 16 until the hub 23 is disengaged from the hub 24. As soon as these hubs are disengaged the pulley 22 ceases to exert a driving force on the shaft 16, and the strain is at once taken off the separator mechanism, and the attendant can then go back to the engine and shut it down. As soon as the separator is ready to start up again, the hand lever 26 is again moved back until the catch 34 engages the notch 35. This brings the hubs 23 and 24 again into driving relation. The engine is then started up and drives the separator mechanism as before.

Having thus described my invention, what I claim as new and desire to secure by Letters Patent, is:—

1. A threshing-machine having a rotatable toothed cylinder to which the grain is fed, a shaft on which said cylinder is mounted, a driving pulley non-rotatably mounted on said shaft and having a hub provided with a clutch portion, a second driving pulley rotatably mounted on said shaft and having a hub provided with a clutch portion for engagement with said first clutch portion, and means for shifting one of said pulleys longitudinally of said shaft to cause said clutch portions to be disengaged.

2. A threshing-machine having a rotatable toothed cylinder at one end of the machine, to which the grain is fed, a shaft on which said cylinder is mounted, a rotatable fan at the other end of the machine for expelling the straw, a shaft on which said fan is mounted, a pulley non-rotatably mounted on said fan-shaft, a second pulley non-rotatably secured to said cylinder-shaft and having a hub provided with a clutch portion, a belt extending over said pulleys, a third pulley rotatably mounted on said cylinder-shaft and having a hub provided with a clutch portion for engagement with said first clutch portion, and means for shifting one of the pulleys on the cylinder shaft longitudinally of the cylinder-shaft to cause said clutch portions to be disengaged.

3. A threshing-machine having a rotatable toothed cylinder to which the grain is fed, a shaft on which said cylinder is mounted, a driving pulley non-rotatably mounted on said shaft and having a hub provided with a clutch portion, a second driving pulley rotatably mounted on said shaft and having a hub provided with a clutch portion for engagement with said first clutch portion, and means for shifting one of said pulleys longitudinally of said shaft to cause said clutch portions to be disengaged, said means comprising a movable arm extending between said pulleys and acting on the hub of the longitudinally-shiftable pulley.

4. A threshing-machine having a rotatable toothed cylinder to which the grain is fed, a shaft on which said cylinder is mounted, a driving pulley non-rotatably mounted on said shaft and having a hub provided with a shoulder portion, a second driving pulley rotatably mounted on said shaft and having a hub provided with a shoulder portion for engagement with said first shoulder portion, and means for shifting one of said pulleys longitudinally of said shaft to cause said shoulder portions to be disengaged.

5. A threshing-machine having a rotatable toothed cylinder to which the grain is fed, a shaft on which said cylinder is mounted, a driving pulley non-rotatably mounted on said shaft and provided with a clutch portion, a second driving pulley rotatably mounted on said shaft and having a clutch portion for engagement with said first clutch portion, and means for shifting one of said pulleys longitudinally of said shaft to cause said clutch portions to be disengaged.

In witness whereof, I have hereunto subscribed my name.

ANDREW O. LOEN.

Copies of this patent may be obtained for five cents each, by addressing the "Commissioner of Patents, Washington, D. C."